(12) United States Patent
Jung et al.

(10) Patent No.: US 12,374,819 B2
(45) Date of Patent: Jul. 29, 2025

(54) ELECTRICAL CONNECTION TERMINAL FOR VEHICLE

(71) Applicants: HYUNDAI MOTOR COMPANY, Seoul (KR); KIA CORPORATION, Seoul (KR); KYUNGSHIN CORP., Incheon (KR)

(72) Inventors: Yun Jae Jung, Suwon-si (KR); Seung Min Yoo, Iksan-si (KR); Byeong Kyu Kim, Seoul (KR); Jun Il Yoon, Incheon (KR); Jae Hyung Kim, Incheon (KR)

(73) Assignees: HYUNDAI MOTOR COMPANY, Seoul (KR); KIA CORPORATION, Seoul (KR); KYUNGSHIN CORP., Incheon (KR)

( * ) Notice: Subject to any disclaimer, the term of this patent is extended or adjusted under 35 U.S.C. 154(b) by 338 days.

(21) Appl. No.: 17/965,249

(22) Filed: Oct. 13, 2022

(65) Prior Publication Data
US 2023/0120243 A1     Apr. 20, 2023

(30) Foreign Application Priority Data
Oct. 14, 2021     (KR) .......................... 10-2021-0136209

(51) Int. Cl.
*H01R 13/24*     (2006.01)
*B60R 16/02*     (2006.01)
*H01R 13/62*     (2006.01)

(52) U.S. Cl.
CPC ............ *H01R 13/24* (2013.01); *H01R 13/62* (2013.01); *B60R 16/02* (2013.01); *H01R 2201/26* (2013.01)

(58) Field of Classification Search
CPC ...... H01R 13/24; H01R 13/62; H01R 13/187; H01R 13/113; H01R 13/115; H01R 2201/26; B60R 16/02
USPC .......................... 439/345, 251, 842, 845, 849
See application file for complete search history.

(56) References Cited

U.S. PATENT DOCUMENTS

| | | | |
|---|---|---|---|
| 5,588,884 A * | 12/1996 | Rudoy ................... | H01R 31/02 439/787 |
| 6,287,156 B1 * | 9/2001 | Swan ................... | H01R 13/187 439/845 |
| 7,014,516 B2 * | 3/2006 | Yang ................... | H01R 13/187 439/845 |

(Continued)

*Primary Examiner* — Gary F Paumen
(74) *Attorney, Agent, or Firm* — MCDONNELL BOEHNEN HULBERT & BERGHOFF LLP

(57) ABSTRACT

An electrical connection terminal for a vehicle is capable of securing structural stability of an electrical connection with a mating terminal. The electrical connection terminal includes a terminal body, provided with a pair of spring couplers facing each other with a predetermined distance therebetween, and a pair of contact springs, respectively assembled to the pair of spring couplers and configured to electrically connect the terminal body to a mating terminal by being brought into contact with the mating terminal inserted between the pair of spring couplers, wherein the contact spring includes a spring body assembled on an outer side of the spring coupler, and a plurality of mating terminal contacts provided independently of each other on the spring body and elastically brought into contact with the mating terminal when the mating terminal is inserted between the pair of spring couplers.

9 Claims, 10 Drawing Sheets

(56) References Cited

U.S. PATENT DOCUMENTS

| | | | |
|---|---|---|---|
| 8,419,486 B2* | 4/2013 | Tyler | H01R 13/187 439/845 |
| 8,827,754 B2* | 9/2014 | Lee | H01R 13/187 439/845 |
| 8,827,755 B2* | 9/2014 | Blakborn | H01R 13/113 439/845 |
| 2003/0060090 A1* | 3/2003 | Allgood | H01R 13/187 439/845 |
| 2018/0034171 A1* | 2/2018 | Tyler | H01R 13/187 |
| 2020/0076105 A1* | 3/2020 | Seipel | H01R 4/62 |

* cited by examiner

ELECTRICAL CONNECTION TERMINAL FOR VEHICLE

CROSS REFERENCE TO RELATED APPLICATIONS

This application claims under 35 U.S.C. § 119 (a) the benefit of priority to Korean Patent Application No. 10-2021-0136209, filed on Oct. 14, 2021, the entire contents of which are incorporated herein by reference.

BACKGROUND

(a) Technical Field

The present disclosure relates to an electrical connection terminal for a vehicle. More particularly, it relates to an electrical connection terminal for a vehicle capable of securing structural connection stability with a mating terminal.

(b) Background Art

Generally, an electric vehicle uses a motor as a driving source to generate driving force for driving, and is provided with a battery and an inverter to supply power to the motor. The motor typically receives power from the battery through an electrical connector.

Recently, connectors used in vehicles are divided into low-voltage connectors and high-voltage connectors according to the allowable current. In the high-voltage connector, the size of a terminal is proportional to an allowable current value. Terminals applicable to a high-voltage connector are manufactured in a blade type and a round type.

A round-type terminal is formed in a cylindrical structure, and is capable of realizing a stable structural electrical connection with a mating terminal even when a vehicle vibrates. However, when the allowable current is increased, the radius of the terminal is increased, thereby increasing the cross-sectional area thereof. Accordingly, the size of the high-voltage connector is increased, which is inefficient.

For a blade-type terminal (i.e., a blade terminal), the increase in size for an increase in allowable current is small compared to the round-type terminal. However, since the blade-type terminal is formed in a plate structure, stability of an electrical connection with a mating terminal is limited when the vehicle vibrates.

For this reason, a conventional blade terminal needs to secure structural contact stability with a mating terminal in order to prevent deterioration in quality.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide an electrical connection terminal for a vehicle, the electrical connection terminal capable of securing structural stability of an electrical connection with a mating terminal.

In one aspect, the present disclosure provides an electrical connection terminal for a vehicle, the electrical connection terminal including a terminal body provided with a pair of spring couplers facing each other, with a predetermined distance therebetween, and a pair of contact springs respectively assembled to the pair of spring couplers and configured to electrically connect the terminal body to a mating terminal by being brought into contact with the mating terminal inserted between the pair of spring couplers, wherein the contact spring includes a spring body assembled on an outer side of the spring coupler, and a plurality of mating terminal contacts configured to elastically contact the mating terminal when the mating terminal is inserted between the pair of spring couplers.

In one embodiment, the plurality of mating terminal contacts may be provided on the spring body so as to be separated from each other by a predetermined distance.

In another embodiment, the plurality of mating terminal contacts may be divided into a first mating terminal contact, disposed at a front side with respect to an insertion direction of the mating terminal between the spring couplers, and a second mating terminal contact, disposed at a rear side of the first mating terminal contact.

In still another embodiment, the spring body may be formed to surround the spring coupler of the terminal body in a closed loop structure and to be fitted on the outer side of the spring coupler.

In yet another embodiment, the spring coupler may be provided with a plurality of spring-fixing holes, and the spring body may be provided with a plurality of elastic joints fixedly caught in the spring-fixing holes when the spring body is fitted on the outer side of the spring coupler.

In still yet another embodiment, the spring coupler may be provided with a stopper configured to allow the spring body to be assembled at a predetermined position on the spring coupler, and the spring body may be fitted on the outer side of the spring coupler up to a point at which the spring body is brought into contact with the stopper.

In a further embodiment, the spring body may be provided with a terminal lance fixedly caught on a locking protrusion formed on an inner side portion of a connector housing, wherein the terminal lance may be caught on the locking protrusion when the electrical connection terminal is assembled to an inner side of the connector housing to prevent the electrical connection terminal from escaping from the connector housing.

In another further embodiment, the terminal body may be provided with a circuit connector connected to a predetermined electrical circuit, wherein the circuit connector may be integrally formed with at least one of the spring couplers.

In still another further embodiment, the mating terminal contact may extend from the spring body, and may be formed in an arc-shaped curved structure.

In yet another further embodiment, the mating terminal contact may be provided with a plurality of contact dots protruding from a central portion of the mating terminal contact, wherein the contact dots may be brought into contact with the mating terminal, which is inserted between the spring couplers.

Other aspects and embodiments of the disclosure are discussed infra.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example vehicles powered by both gasoline and electricity.

BRIEF DESCRIPTION OF THE FIGURES

The above and other features of the present disclosure will now be described in detail with reference to certain exemplary embodiments thereof illustrated in the accompanying drawings, which are given hereinbelow by way of illustration only, and thus are not limitative of the present disclosure, and wherein.

Figure 1:
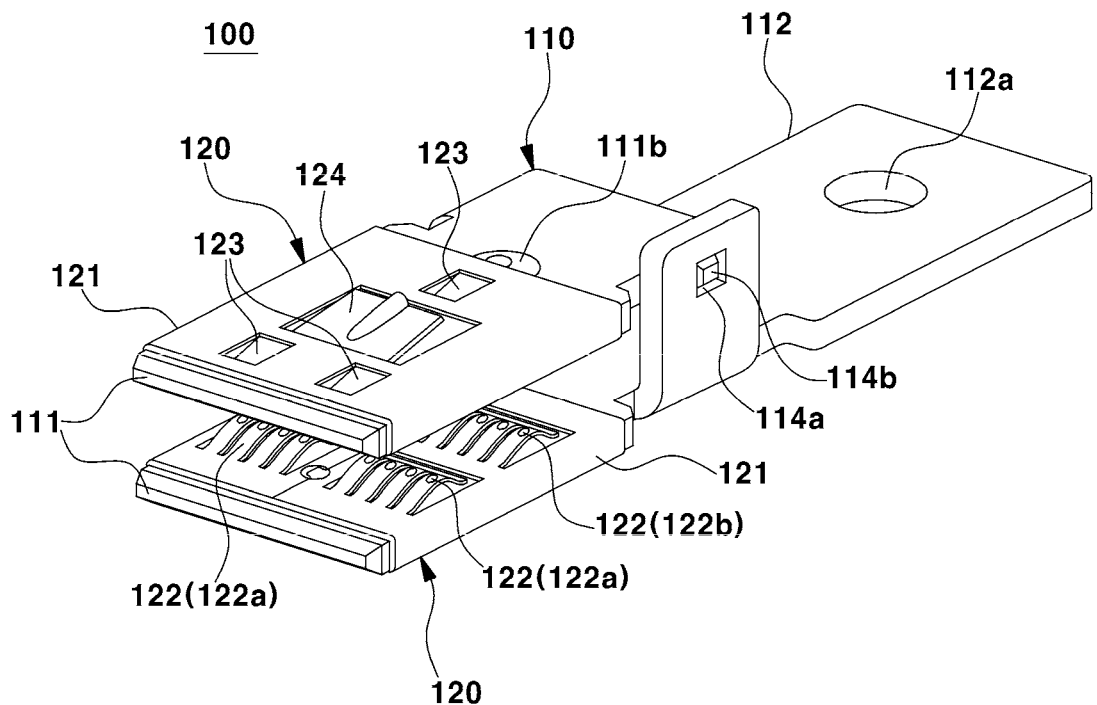
FIG. 1 is a view illustrating a coupled state of an electrical connection terminal according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure relates to an electrical connection terminal applied to a high-voltage connector of a vehicle. The high-voltage connector is a connector capable of transmitting a relatively large amount of current to a mating connector, among connectors applied to a vehicle. The high-voltage connector adopts a terminal capable of transmitting a large amount of current to a mating terminal.

The electrical connection terminal of the present disclosure is a blade-type terminal, which is one of electrical connection terminals applied to the high-voltage connector, and is also referred to as a blade terminal. The blade terminal is brought into contact with a tab terminal, which is a mating terminal, so as to be electrically connected to the tab terminal.

Figure 2:
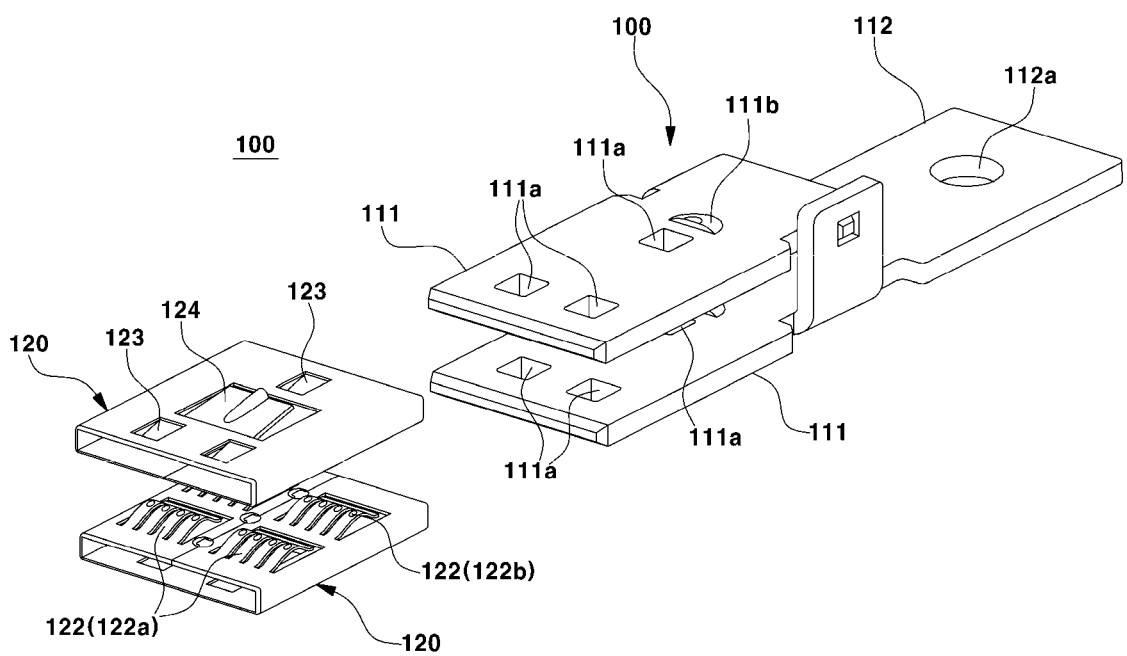
FIG. 2 is a view illustrating a decoupled state of the electrical connection terminal according to the embodiment of the present disclosure.
Figure 3:
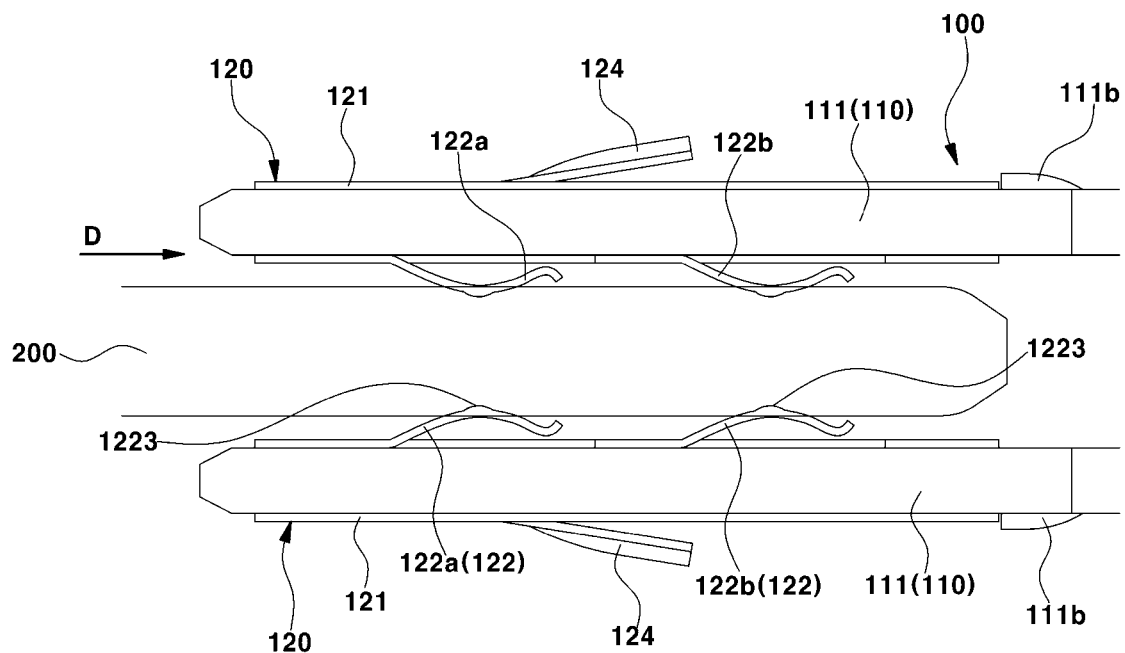
FIG. 3 is a side view of the coupled state of the electrical connection terminal according to the embodiment of the present disclosure.
Figure 4:
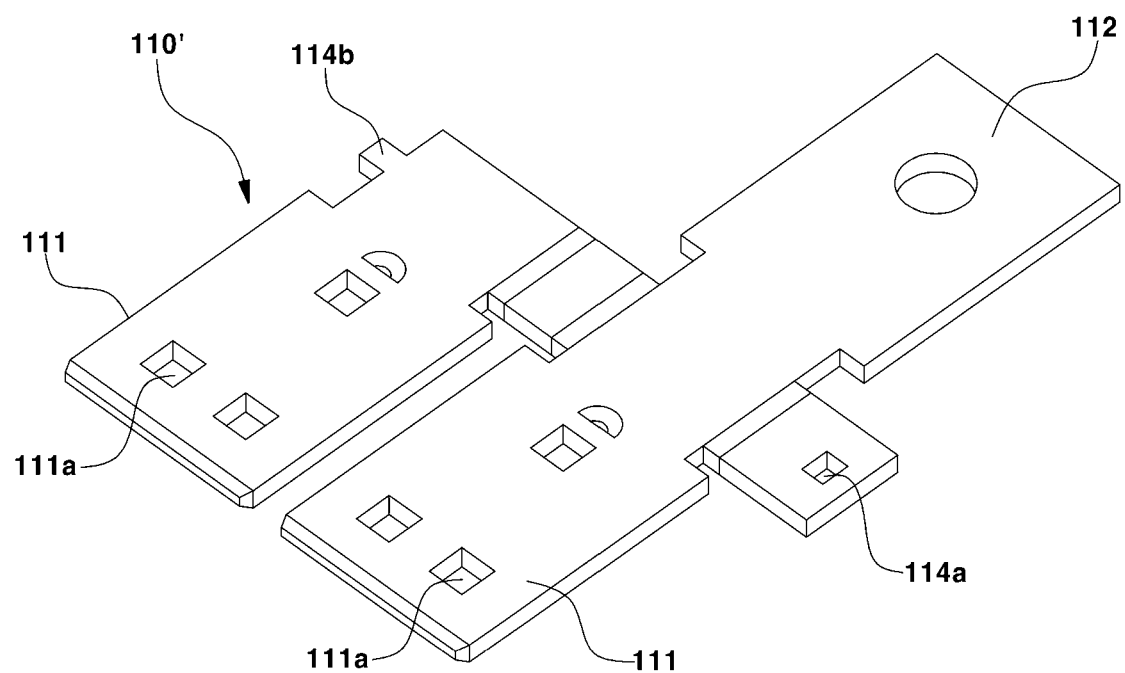
FIG. 4 is a view illustrating a part of a process of manufacturing the electrical connection terminal according to the embodiment of the present disclosure.
Figure 5A:
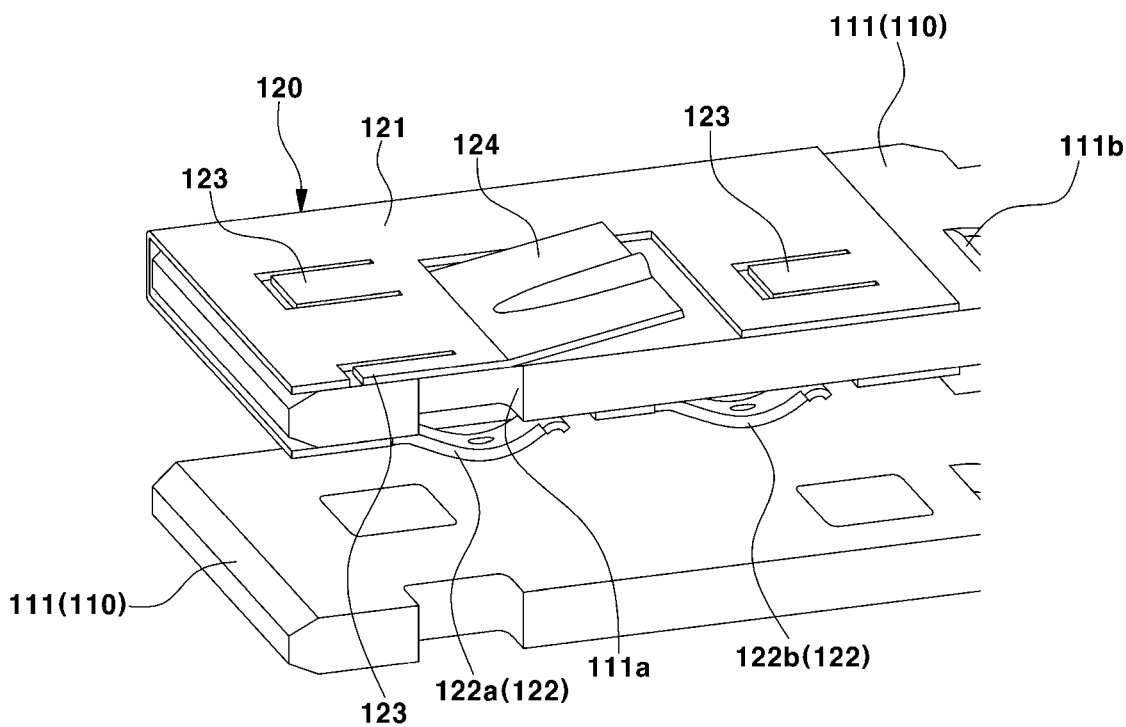
FIGS. 5A and 5B are views illustrating a process of assembling the electrical connection terminal according to the embodiment of the present disclosure.
Figure 5B:
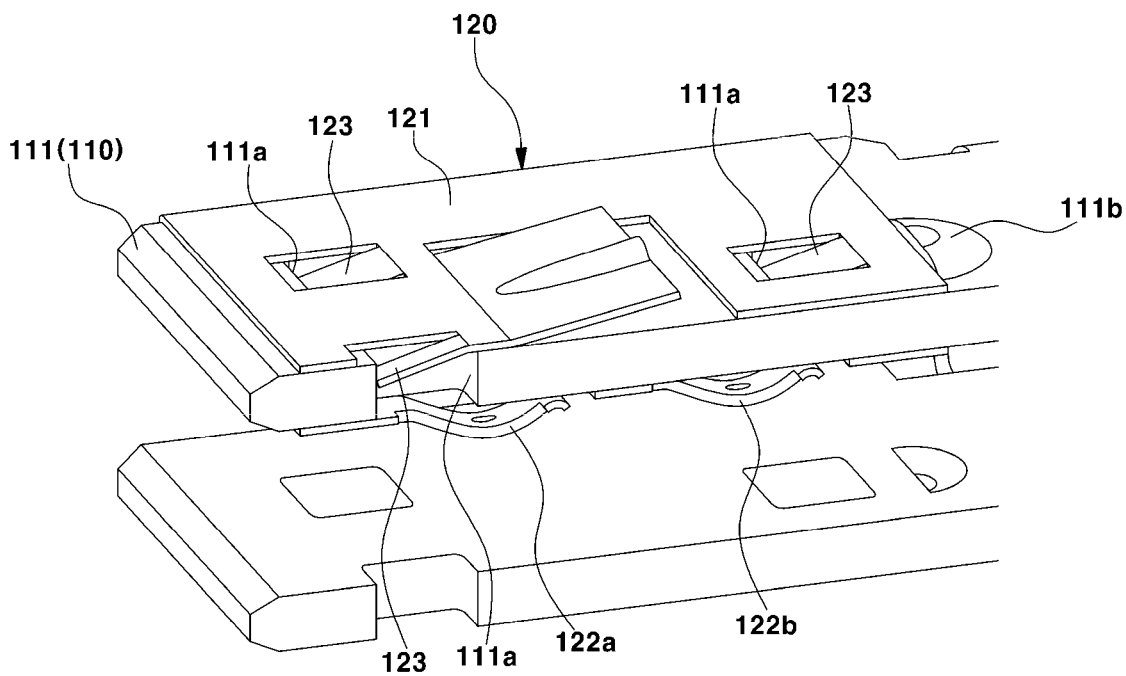
Figure 6:
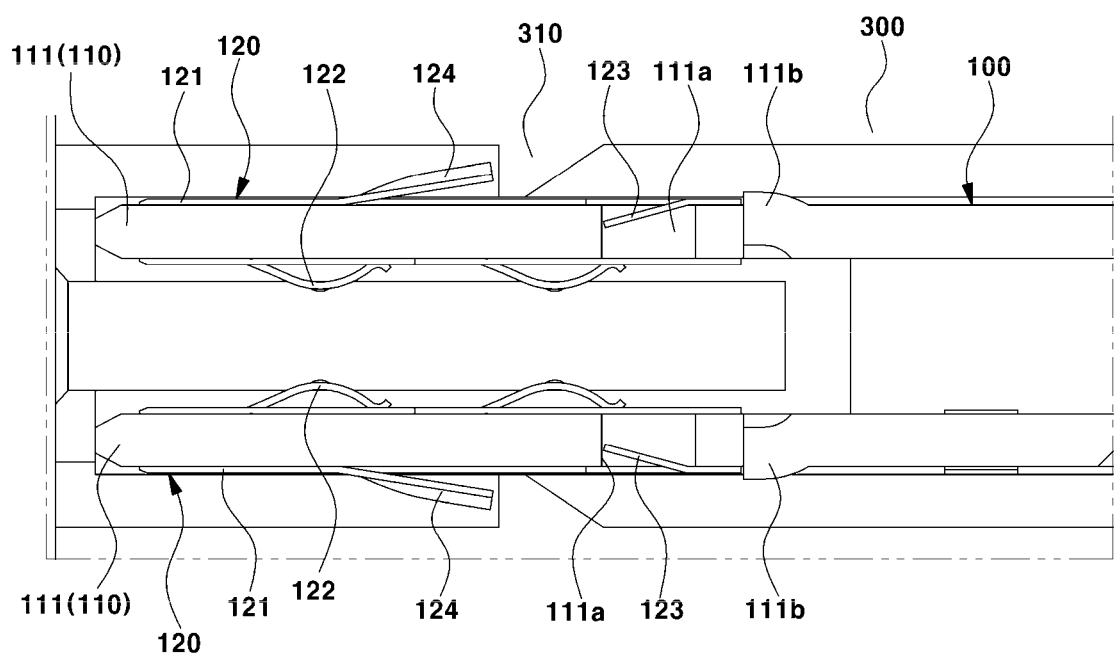
FIG. 6 is a view illustrating the state in which the electrical connection terminal according to the embodiment of the present disclosure is assembled to a connector housing.
Figure 7:
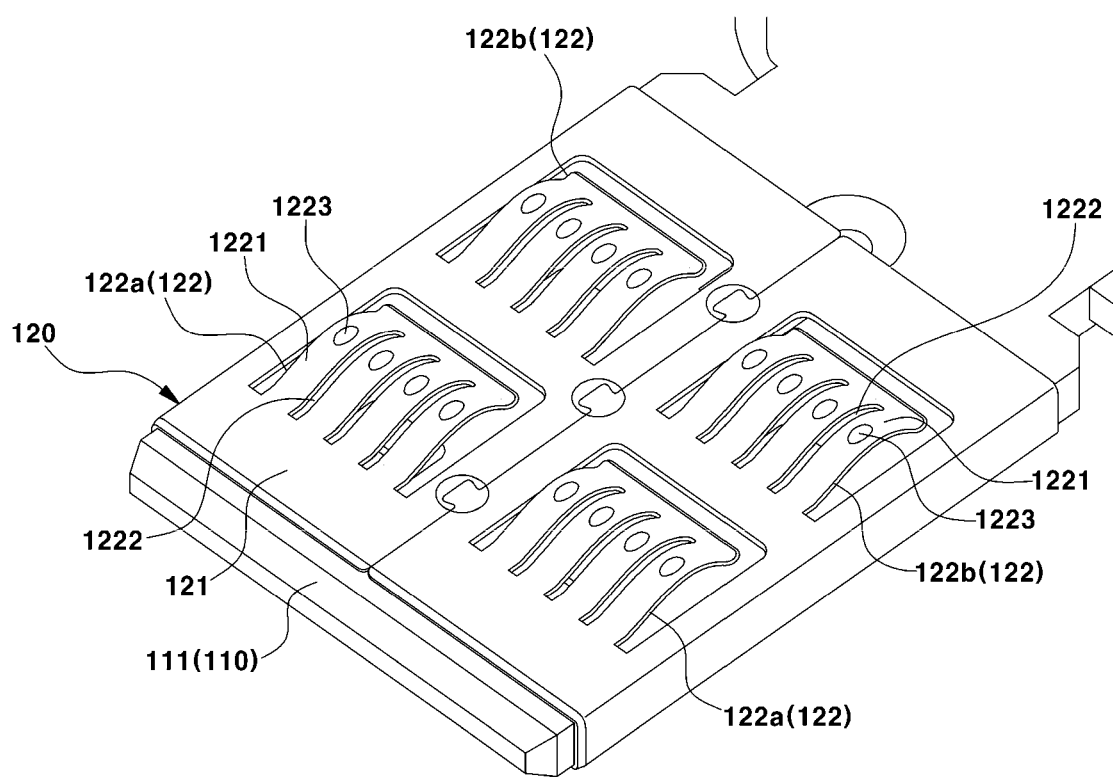
FIG. 7 is an enlarged view of a portion of the electrical connection terminal according to the embodiment of the present disclosure.
Figure 8A:
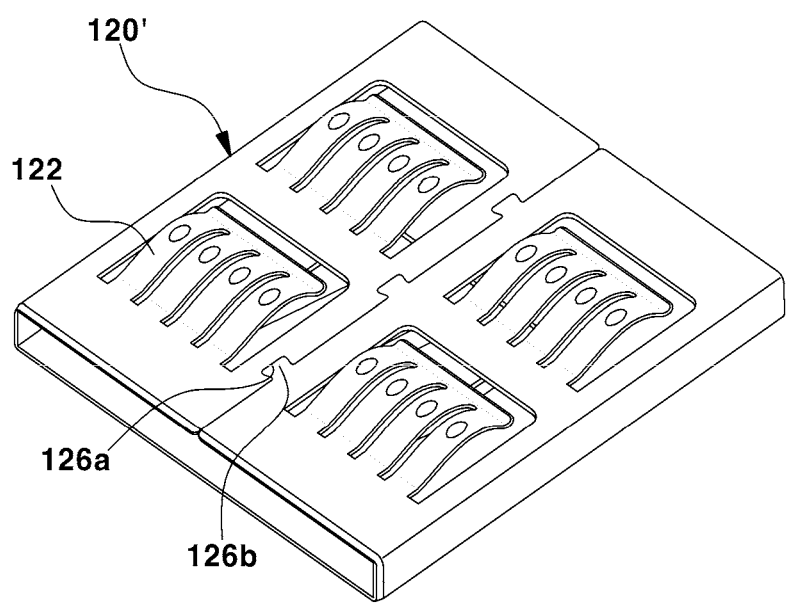
FIGS. 8A and 8B are views illustrating a part of a process of manufacturing the electrical connection terminal according to the embodiment of the present disclosure.
Figure 8B:
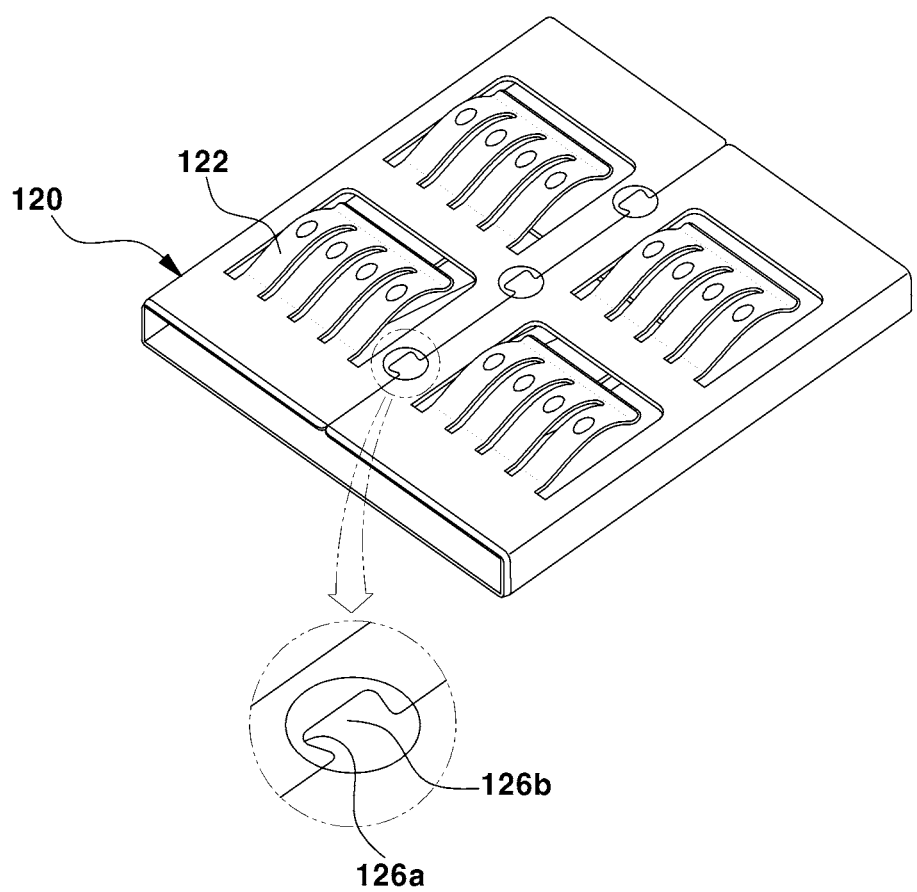
Figure 9A:
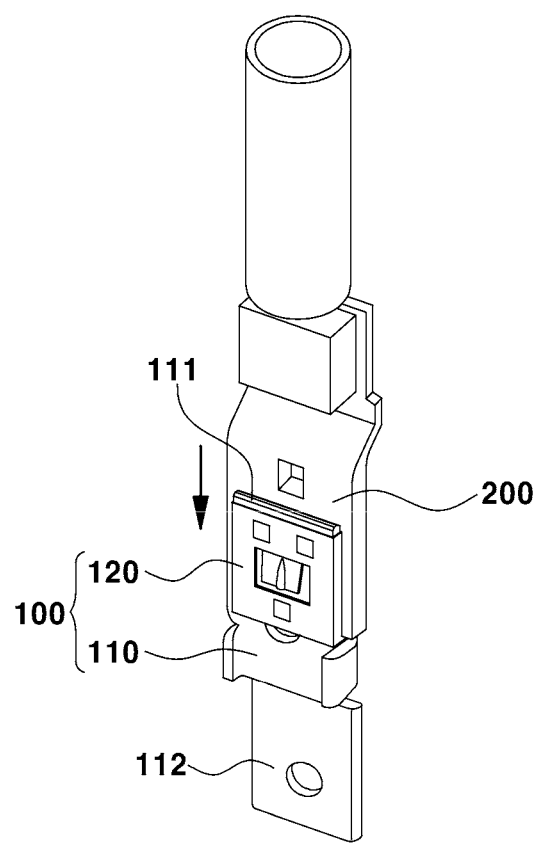
FIGS. 9A and 9B are views illustrating the manner in which a mating terminal is coupled to the electrical connection terminal according to the embodiment of the present disclosure.
Figure 9B:
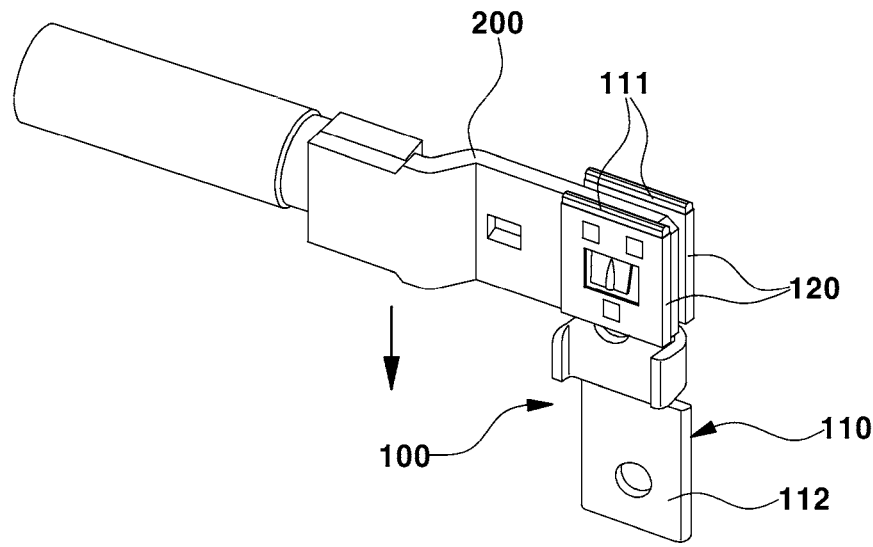
Figure 10A:
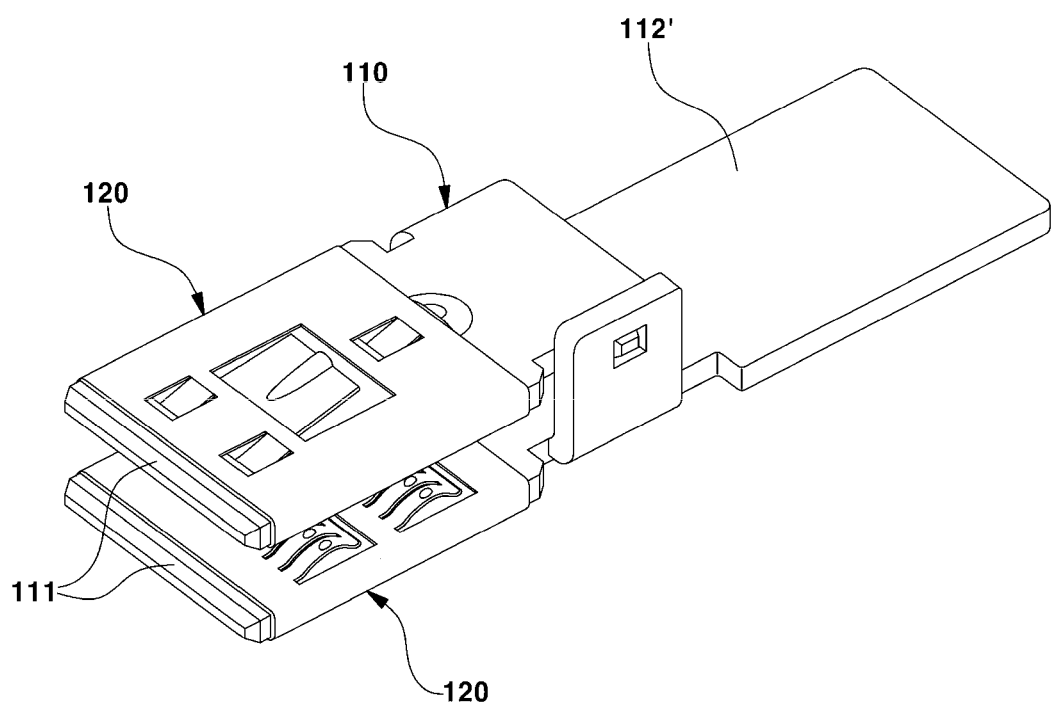
FIGS. 10A and 10B are modified embodiments of the electrical connection terminal according to the present disclosure.
Figure 10B:
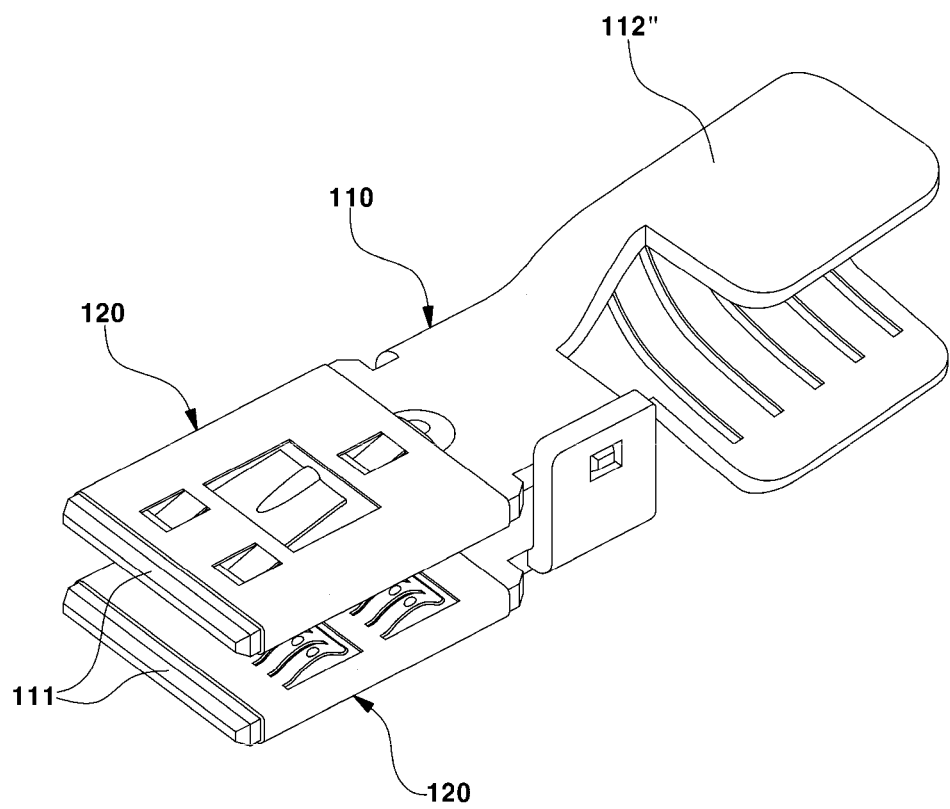

FIG. 1 illustrates the coupled state of an electrical connection terminal according to an embodiment of the present disclosure, FIG. 2 illustrates the decoupled state of the electrical connection terminal, FIG. 3 is a side view of the coupled state of the electrical connection terminal, FIG. 4 illustrates a part of a process of manufacturing a terminal body constituting the electrical connection terminal, FIGS. 5A and 5B illustrate a process of assembling the electrical connection terminal, FIG. 6 illustrates the state in which the electrical connection terminal is assembled to a connector housing, FIG. 7 is an enlarged view of a portion of the electrical connection terminal, FIGS. 8A and 8B illustrate part of a process of manufacturing a contact spring constituting the electrical connection terminal, FIGS. 9A and 9B illustrate the manner in which a mating terminal is coupled to the electrical connection terminal, and FIGS. 10A and 10B are modified embodiments of the electrical connection terminal.

As illustrated in FIGS. 1 and 2, an electrical connection terminal 100 of the present disclosure includes a terminal body 110 and a pair of contact springs 120 coupled to the terminal body 110.

The terminal body 110 receives current from a predetermined electrical circuit and transmits the current received from the electrical circuit to a mating terminal (see 200 in FIG. 3) through the contact spring 120. The electrical circuit is a circuit configured to apply current to the terminal body 110.

The terminal body 110 is provided with a pair of spring couplers 111, electrically connected to a mating terminal 200, and with a circuit connector 112, electrically connected to an electrical circuit. The circuit connector 112 may be integrally formed with at least one of the spring couplers 111 and extend therefrom.

Each of the spring couplers 111 is provided with a contact spring 120 assembled thereto, and the circuit connector 112 is provided with one constituent of an electrical circuit electrically connected thereto. For example, the one constituent of the electrical circuit may be a wire.

Each of the spring couplers 111 is formed in a flat plate structure, and has therein a plurality of spring-fixing holes 111a into which the contact spring 120 is fixed. The circuit connector 112 may have a shape suitable for the characteristics of the electrical circuit connected to the circuit connector 112.

The terminal body 110 may be manufactured by pressing using a mold. For example, the terminal body 110 having the form illustrated in FIG. 2 may be manufactured through a process in which a plate material is placed into a mold and press-worked in a form having a coupling protrusion 114b and a coupling hole 114a, as illustrated in FIG. 4, after which the pressed plate 110' is bent so that the coupling protrusion 114b is inserted into the coupling hole 114a. Here, the coupling protrusion 114b is fixed in the state of being inserted into the coupling hole 114a, and the spring couplers 111 are disposed to face each other with a predetermined distance therebetween. The spring couplers 111 are disposed parallel to each other.

As illustrated in FIGS. 1 and 3, the contact spring 120 is coupled to the terminal body 110 and transmits current applied to the terminal body 110 to the mating terminal 200. Specifically, the contact spring 120 is brought into contact with the mating terminal 200 inserted between the spring couplers 111 of the terminal body 110 so as to transmit the current applied to the circuit connector 112 to the mating terminal 200.

That is, the contact spring 120 electrically connects the mating terminal 200 inserted between the spring couplers 111 to the spring couplers 111 and the terminal body 110. The contact spring 120 may be manufactured as a conductive elastic body.

As illustrated in FIG. 2, the contact spring 120 includes a spring body 121, and further includes a plurality of elastic joints 123 and a terminal lance 124 provided in the spring body 121. Also, as illustrated in FIGS. 2 and 7, the contact spring 120 includes a plurality of mating terminal contacts 122 individually provided on the spring body 121.

The spring body 121 is assembled on the outer side of the spring coupler 111 of the terminal body 110. The spring body 121 is a fitted on the outer side of the spring coupler 111. The spring body 121 is formed so as to surround the spring coupler 111 in a closed loop structure. In other words, the spring body 121 is formed in the shape of a box surrounding the spring coupler 111. The whole spring body 121 is closely adhered to the spring coupler 111.

In addition, the spring body 121 is supported by and fixed to the spring coupler 111 by the elastic joint 123 inserted into the spring coupler 111.

The elastic joint 123 is provided integrally with an upper side of the spring body 121, and is bent from the upper side of the spring body 121. In other words, the elastic joint 123 is provided in the spring body 121 in a form bent from the upper side of the spring body 121.

The elastic joint 123 is bent toward a lower side of the spring body 121. As illustrated in FIG. 5A, while the spring body 121 is fitted to the spring coupler 111, the elastic joint 123 moves in the state of being rotated parallel to the upper side of the spring body 121 by the spring coupler 111. As illustrated in FIG. 5B, when the spring body 121 reaches a predetermined position in the state of being completely fitted to the spring coupler 111, the elastic joint 123 is inserted into the spring-fixing hole 111a in the spring coupler 111 as the elastic joint 123 is restored to its original state by the elastic restoring force thereof.

The elastic joint 123 is inserted into the spring-fixing hole 111a to suppress movement of the spring body 121 in a direction of separation from the spring coupler 111. The elastic joint 123 is fixedly caught in the spring-fixing hole 111a when the spring body 121 is completely assembled to the spring coupler 111.

The elastic joint 123 prevents the spring body 121 from being separated from the spring coupler 111. Because the spring body 121 is provided with the elastic joint 123, the spring body 121 is coupled to the spring coupler 111 of the terminal body 110 without a separate welding process. Also, because the spring body 121 is provided with the elastic joint 123, the spring body 121 is fixed to the spring coupler 111 without a separate coupling member.

In addition, as illustrated in FIG. 3, in order to assemble the spring body 121 at a predetermined position on the spring coupler 111, the spring coupler 111 is provided with a stopper 111b. The stopper 111b protrudes from a rear surface of the spring coupler 111. The spring body 121 is fitted on the spring coupler 111 until it comes into contact with the stopper 111b so as to be assembled at a predetermined position on the spring coupler 111.

The stopper 111b prevents the spring body 121 from being fitted excessively closely, past the predetermined position on the spring coupler 111. In addition, the stopper 111b prevents the elastic joint 123 from being separated from the spring-fixing hole 111a.

Here, based on the state in which the spring body 121 is assembled to the spring coupler 111, an upper side of the spring body 121 faces an outer side of the terminal body 110, and a lower side of the spring body 121 faces an inner side of the terminal body 110. The inner side of the terminal body 110 is a space between the spring couplers 111, and the outer side of the terminal body 110 is a side opposite the space with respect to the spring coupler 111.

Here, an assembly direction in which the spring body 121 is fitted to the spring coupler 111 is referred to as an assembly direction of the spring body 121 or an assembly direction of the contact spring 120. The assembly direction of the spring body 121 is the same as the insertion direction of the mating terminal 200 between the spring couplers 111.

The elastic joints 123 may be disposed at opposite sides of the terminal lance 124 with respect to the assembly direction of the spring body 121. In addition, the elastic joints 123 may be arranged in a direction perpendicular to the assembly direction of the spring body 121.

The terminal lance 124 is integrally formed on the upper side of the spring body 121, and is fixedly caught on a locking protrusion 310 formed on a connector housing 300, as illustrated in FIG. 6. The terminal lance 124 is bent from the upper side of the spring body 121, and is bent in a direction away from the elastic joint 123. The terminal lance 124 is bent upwards from the spring body 121.

Because the terminal lance 124 is caught on the locking protrusion 310 of the connector housing 300 when the electrical connection terminal 100 is assembled inside the connector housing 300, the terminal lance 124 prevents the electrical connection terminal 100 from being separated from the connector housing 300.

The locking protrusion 310 is formed to protrude on an inner side portion of the connector housing 300. The terminal lance 124 is pressed toward the upper side of the spring body 121 by the locking protrusion 310 when the electrical connection terminal 100 is inserted into the connector housing 300, and is then restored to the original state thereof by the elastic restoring force thereof after passing the locking protrusion 310.

Generally, a high-voltage connector includes a connector housing made of a non-conductive material for mechanical connection with a mating connector and a connector terminal (i.e., an electrical connection terminal) made of a conductive material for electrical connection with a mating connector.

Because the terminal lance 124 is provided on the spring body 121, no separate component for fixing the electrical connection terminal 100 to the connector housing 300 is needed.

Meanwhile, it is possible to obviate the terminal lance 124 from the spring body 121, and to provide a housing lance (not illustrated) in the connector housing 300 instead. However, when the terminal lance 124 is provided in the spring body 121, the amount of space for accommodating the electrical connection terminal 100 in the connector housing can be reduced compared to the case in which the housing lance is provided on the connector housing 300.

As illustrated in FIG. 7, each of the plurality of mating terminal contacts 122 is integrally formed on the lower side of the spring body 121. The multiple mating terminal contacts 122 are provided independently of each other on the spring body 121.

The mating terminal contacts 122 are pressed by the mating terminal 200 when brought into contact with the mating terminal 200 inserted between the spring couplers 111 so as to elastically contact the surface of the mating terminal 200.

The mating terminal contacts 122 may be divided into a first mating terminal contact 122a and a second mating terminal contact 122b based on the order in which the mating terminal contacts 122 are brought into contact with the mating terminal 200 inserted between the spring couplers 111.

In other words, the mating terminal contacts may be divided into the first mating terminal contact 122a, disposed at a front side with respect to an insertion direction of the mating terminal 200 between the spring couplers 111, and the second mating terminal contact 122b, disposed at a rear side of the first mating terminal contact 122a.

"D" in FIG. 3 denotes an insertion direction of the mating terminal 200 between the spring couplers 111. When the mating terminal 200 is inserted between the spring couplers 111, the mating terminal 200 comes into contact with the first mating terminal contact 122a first, before coming into contact with the second mating terminal contact 122b.

In other words, the first mating terminal contact 122a is brought into contact with the mating terminal 200 before the second mating terminal contact 122b is brought into contact with the mating terminal 200, and the second mating terminal contact 122b is brought into contact with the mating terminal 200 after the first mating terminal contact 122a is brought into contact with the mating terminal 200.

In addition, the first mating terminal contact 122a may be arranged in two or more rows in a direction perpendicular to the insertion direction of the mating terminal 200. The second mating terminal contact 122b may also be arranged in two or more rows in a direction perpendicular to the insertion direction of the mating terminal 200.

The mating terminal contacts 122 are provided on the spring body 121 so as to be separated from each other by a predetermined distance. Specifically, the first mating terminal contact 122a and the second mating terminal contact 122b are provided on the spring body 121 with a predetermined distance therebetween. The first mating terminal contacts 122a are provided on the spring body 121 in the state of being spaced apart from one another by a predetermined distance. The second mating terminal contacts 122b are provided on the spring body 121 in the state of being spaced apart from one another by a predetermined distance.

Because the mating terminal contacts 122 are provided independently of each other on the spring body 121 with a predetermined distance therebetween, rotational movement of the second mating terminal contact 122b due to the first mating terminal contact 122a coming into contact with the mating terminal 200 may be fundamentally blocked.

Although not illustrated in the drawings, in the case where the second mating terminal contact 122b is integrally formed with the first mating terminal contact 122a, there is the possibility of the second mating terminal contact 122b being rotated when the first mating terminal contact 122a is brought into contact with the mating terminal 200. When the second mating terminal contact 122b is rotated toward the spring coupler 111, reliability of contact between the second mating terminal contact 122b and the mating terminal 200 is deteriorated.

More specifically, in the case in which the first mating contact 122a and the second mating contact 122b are integrally formed, the first mating terminal contact 122a is pressed by the mating terminal 200 when the first mating terminal contact 122a is brought into contact with the mating terminal 200, and, as such, the second mating terminal contact 122b rotates toward the spring coupler 111. This may cause a problem in which the second mating terminal contact 122b does not come into contact with the mating terminal 200.

For this reason, the mating terminal contacts 122 of the present disclosure are configured independently of each other and independently come into contact with the mating terminal 200, and this fundamentally prevents rotation of the second mating terminal contact 122b when the first mating terminal contact 122a comes into contact with the mating terminal 200.

In other words, the contact spring 120 of the present disclosure has a structure in which rotation of the second mating terminal contact 122b is blocked when the first mating terminal contact 122a is brought into contact with the mating terminal 200.

Accordingly, in the contact spring 120, the first mating terminal contact 122a and the second mating terminal contact 122b are both in stable contact with the mating terminal 200, and, as such, contact stability with the mating terminal 200 is secured.

Meanwhile, as illustrated in FIG. 7, each of the mating terminal contacts 122 is formed in an arc-shaped curved structure. The mating terminal contacts 122 extend from the spring body 121. The mating terminal contacts 122 are provided on the lower side of the spring body 121 and convexly curved toward a side opposite the upper side of the spring body 121.

Because the mating terminal contacts 122 are formed in a curved structure, the mating terminal contacts 122 are elastically brought into contact with the surface of the counter terminal 200. The mating terminal contacts 122 are pressed by the mating terminal 200 when brought into contact with the mating terminal 200 inserted between the spring couplers 111, and thus an elastic restoring force is generated.

The mating terminal contacts 122 are each formed in a structure in which, with respect to the insertion direction of the mating terminal 200, a front end thereof is integrally formed with the spring body 121 and a rear end thereof is separated from the spring body 121. In the mating terminal contact 122, only the front end thereof is formed integrally with the spring body 121, and the remaining portions, including the rear end thereof, are separated from the spring body 121.

In addition, each of the mating terminal contacts 122 may have a structure including a plurality of contact beams 1221 whose front ends are integrally formed with the spring body 121 and whose rear ends are connected to one another. The contact beams 1221 are arranged in a direction perpendicular to the assembly direction of the spring body 121.

In the mating terminal contact 122, a slit 1222 is provided between each of the contact beams 1221. That is, the mating terminal contact 122 is provided with a plurality of slits 1222. The slits 1222 each extend in the assembly direction of the spring body 121 and are spaced apart from one another in a direction perpendicular to the assembly direction of the spring body 121.

Each of the contact beams 1221 may have a contact dot 1223 on a central portion thereof. That is, the mating terminal contact 122 may be provided with a plurality of contact dots 1223 on a central portion thereof. The contact dots 1223 are arranged in a direction perpendicular to the assembly direction of the spring body 121. Each of the contact dots 1223 is convexly formed on the central portion of the contact beam 1221. That is, the contact dots 1223 are each convexly formed on the central portion of the mating terminal contact 122.

Each of the contact dots 1223 is brought into contact with the mating terminal 200 inserted between the spring couplers 111. The number of contact dots 1223 may be selectively changed according to the size of the contact spring 120.

The contact spring 120 configured as described above may be manufactured by pressing and bending a plate material. First, a plate having a joint hole 126a and a joint protrusion 126b at opposite ends thereof is manufactured through a pressing process, and the plate is bent through a bending process so that the joint hole 126a and the joint protrusion 126b face each other. Then, as illustrated in FIG. 8A, the opposite ends of the plate 120' are assembled by forcibly inserting the joint protrusion 126b into the joint hole 126a.

Subsequently, the joint protrusion 126b and the periphery thereof are pressed through a caulking process, as illustrated in FIG. 8B, to prevent the joint protrusion 126b from being separated from the joint hole 126a, whereby the manufacturing of the contact spring 120 is completed. Here, the joint protrusion 126b is fixed into the joint hole 126a through the caulking process, so that the temporarily assembled opposite ends of the plate 120' are kept connected to each other. As a result, the contact spring 120 maintains a closed-loop cross-sectional structure without becoming deformed.

Meanwhile, as illustrated in FIG. 2, the terminal body 110 has a structure in which a space between the spring couplers 111 is open. The space between the spring couplers 111 is a space into which the mating terminal 200 is inserted, and is an entirely open space except for a portion closed by the spring coupler 111. That is, all four sides of the space between the spring couplers 111 are open.

Since the spring couplers 111 are formed in a structure in which the space therebetween is open, the terminal body 110 does not limit the direction of insertion of the mating terminal 200. Therefore, the mating terminal 200 can be inserted in the terminal body 110 in a straight manner, as illustrated in FIG. 9A, and can also be inserted in the terminal body 110 at a right angle, as illustrated in FIG. 9B.

In addition, a central portion of the terminal body 110 may be formed to have a box structure. A central portion of the terminal body 110 is integrally formed with the spring coupler 111 and the circuit connector 112, and integrally connects the spring coupler 111 and the circuit connector 112. Rear portions of the spring couplers 111 are integrally connected by the central portion of the terminal body 110.

In addition, the circuit connector 112 of the terminal body 110 may be changed into various shapes depending on the type of component of an electrical circuit connected to the terminal body 110.

For example, when the component of the electrical circuit that is coupled to the circuit connector 112 is a bus bar, a hole 112a into which the bus bar is bolted may be provided in the circuit connector 112, as illustrated in FIG. 1.

In addition, when a component of the electrical circuit coupled to the circuit connector 112 is a general high-voltage wire, a fusion-bonding manner or a compression-bonding manner may be applied. When the electrical wire is coupled to the circuit connector 112 through ultrasonic welding or resistance welding, a flat-plate-type circuit connector 112' may be applied, as illustrated in FIG. 10A. When the electrical wire is coupled to the circuit connector 112 through hydraulic compression, a barrel-type circuit connector 112'' may be applied, as illustrated in FIG. 10B.

As such, in the electrical connection terminal 100 of the present disclosure, the circuit connector 112 of the terminal body 110 can be manufactured in various types according to the component types of the electrical circuit.

As is apparent from the above description, an electrical connection terminal for a vehicle of the present disclosure provides the following effects.

First, an electrical connection terminal is connected to a mating terminal in a multi-contact structure by a plurality of mating terminal contacts independently provided on a spring body, and, as such, contact stability for electrical connection with the mating terminal can be secured, thereby improving quality.

Second, since a contact spring is fixed to a terminal body in a simple assembly manner, a separate welding process for fixing the contact spring to the terminal body is unnecessary in the electrical connection terminal, resulting in reduced manufacturing costs and improved productivity.

Third, in the electrical connection terminal, a circuit connector of the terminal body can be manufactured in various types depending on the component type of the electrical circuit.

The disclosure has been described in detail with reference to embodiments thereof. However, it will be appreciated by those skilled in the art that changes may be made in these embodiments without departing from the principles and spirit of the disclosure, the scope of which is defined in the appended claims and equivalents thereto.

The invention claimed is:

1. An electrical connection terminal for a vehicle comprising:
    a terminal body provided having a pair of spring couplers facing each other, the pair of spring couplers being separated by a predetermined distance; and
    a pair of contact springs secured to the pair of spring couplers and configured to electrically connect the terminal body to a mating terminal by being brought into contact with the mating terminal inserted between the pair of spring couplers;
    wherein each contact spring comprises:
    a spring body positioned on an outer side of the spring coupler; and
    a plurality of mating terminal contacts provided independently of each other on the spring body, and elastically brought into contact with the mating terminal when the mating terminal is inserted between the pair of spring couplers;
    wherein the plurality of mating terminal contacts are divided into a first mating terminal contact, positioned at a front side of the mating terminal contact with respect to an insertion direction of the mating terminal between the spring couplers, and a second mating terminal contact, positioned at a rear side of the first mating terminal contact;
    wherein the first mating terminal contact comprises a first front end integrally formed with the spring body and a first rear end separated from the spring body; and wherein the second mating terminal contact comprises a second front end integrally formed with the spring body and a second rear end separated from the spring body.

2. The electrical connection terminal of claim 1, wherein the plurality of mating terminal contacts are positioned on the spring body separated by a predetermined distance.

3. The electrical connection terminal of claim 1, wherein the spring body surrounds the spring coupler of the terminal body in a closed loop structure, and is fitted on an outer side of the spring coupler.

4. The electrical connection terminal of claim 3, wherein each of the pair of spring couplers comprises a plurality of spring-fixing holes, and the spring body comprises a plurality of elastic joints fixedly caught in the spring-fixing holes when the spring body is fitted on the outer side of each of the spring couplers.

5. The electrical connection terminal of claim 4, wherein the spring coupler comprising a stopper configured to allow the spring body to be assembled at a predetermined position on each of the spring couplers, and the spring body is fitted on the outer side of each of the spring couplers up to a point at which the spring body is brought into contact with the stopper.

6. The electrical connection terminal of claim 1, wherein the spring body comprises a terminal lance fixedly caught on a locking protrusion formed on an inner side portion of a connector housing, and wherein the terminal lance is caught on the locking protrusion when the electrical connection terminal is assembled to an inner side of the connector housing to prevent the electrical connection terminal from escaping from the connector housing.

7. The electrical connection terminal of claim 1, wherein the terminal body comprises a circuit connector connected to a predetermined electrical circuit, and wherein the circuit connector is integrally formed with at least one of the spring couplers.

8. The electrical connection terminal of claim 1, wherein the mating terminal contact extends from the spring body, and is formed in an arc-shaped curved structure.

9. The electrical connection terminal of claim 8, wherein the mating terminal contact comprises a plurality of contact dots protruding from a central portion of the mating terminal contact, and wherein the contact dots are brought into contact with the mating terminal, which is inserted between the pair of spring couplers.

* * * * *